United States Patent [19]

Zanoni

[11] 4,128,315

[45] Dec. 5, 1978

[54] THIN ELECTROCHROMIC DISPLAY

[75] Inventor: Louis A. Zanoni, Trenton, N.J.

[73] Assignee: Timex Corporation, Waterbury, Conn.

[21] Appl. No.: 806,892

[22] Filed: Jun. 15, 1977

[51] Int. Cl.² ............................ G02F 1/00; G02F 1/17; G02F 1/23

[52] U.S. Cl. .................................................. 350/357

[58] Field of Search ...................... 350/357, 334, 343; 29/570, 592 R

[56] References Cited

U.S. PATENT DOCUMENTS

| 3,944,333 | 3/1976 | Leibowitz | 350/357 |
| 3,975,086 | 8/1976 | Leibowitz | 350/357 |
| 3,995,943 | 12/1976 | Jasinski | 350/357 |
| 4,012,831 | 3/1977 | Leibowitz | 29/570 |
| 4,056,881 | 11/1977 | Holt | 29/592 R |
| 4,066,336 | 1/1978 | Zeller | 350/357 |

Primary Examiner—Stanley D. Miller, Jr.
Assistant Examiner—James W. Davie
Attorney, Agent, or Firm—William C. Crutcher

[57] ABSTRACT

A thin electrochromic display suitable for manufacture in a continuous process on a backing tape which becomes part of the display. The display is a sandwich structure comprised of a transparent substrate, transparent electrodes having persistent electrochromic material thereon, a solid cationic ion exchange resin electrolyte in contact with the electrochromic material, a conductive metal foil member with electroreactive layer thereon, and an impervious adhesive backing tape adhered to the substrate around the foil member and also covering and adhered to the foil member to seal the display and having an aperture therein for permitting electrical contact to be made with the foil member.

4 Claims, 9 Drawing Figures

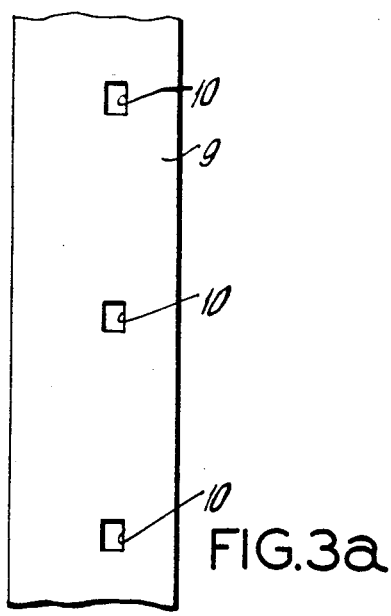
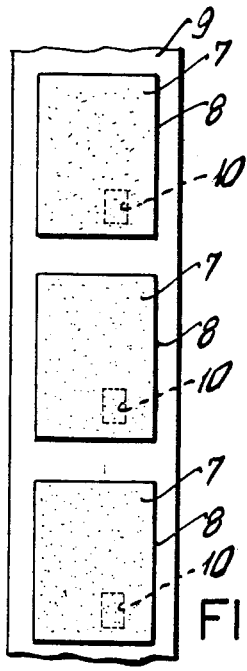
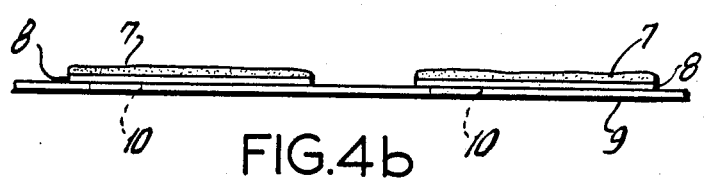
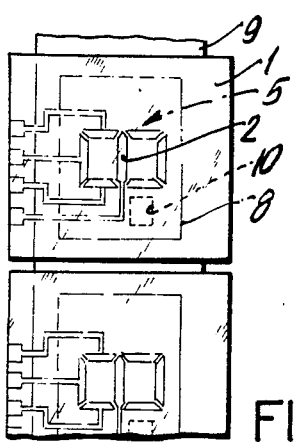
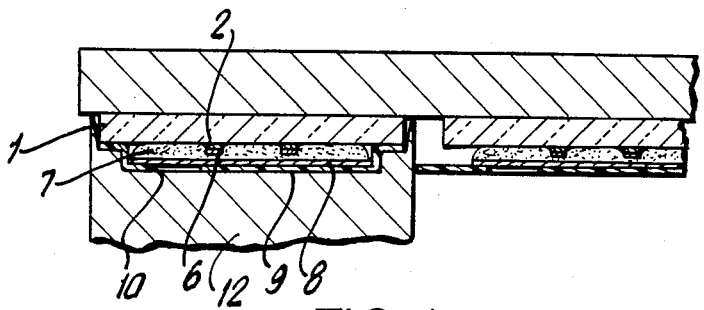

THIN ELECTROCHROMIC DISPLAY

BACKGROUND OF THE INVENTION

This invention relates generally to electrooptic displays of the electrochromic type, wherein a persistent electrochromic material undergoes reversible and stable color changes upon the application of an electric field. More particularly, the invention relates to a thin electrochromic display suitable for manufacture in a continuous process.

Electrochromic displays are well known in the art, examples being shown in U.S. Pat. No. 4,012,831 issued Mar. 22, 1977 to Leibowitz and assigned to the present assignee, which describes a process for making an electroreactive layer on the rear electrode used in an electrochromic display by surface oxidizing and subsequently heat treating in hydrogen a tungsten metal layer on a ceramic base. When the ceramic base is used as a substrate, this substantially adds to the thickness of the display.

Electrochromic displays built up in layers from the front substrate are known in the art using solid or crystalline electrolytes as ion carriers to enable alternately darkening or bleaching the electrochromic material when a field is applied across the electrolyte. Examples of such displays may be seen in U.S. Pat. No. 4,009,936 issued to Kasai or Mar. 1, 1977, U.S. Pat. No. 3,995,943 issued to Jasinski or Dec. 7, 1976 and U.S. Pat. No. 3,971,624 issued to Bruesch et at on July 27, 1976. The Jasinski and Kasai patents utilize a sealant layer of thermosetting plastic or epoxy resin to enclose a layer of metallic silver and the solid electrolyte, and require extension of the silver layer or an external electrode passing through the sealant to make electrical contact. The Bruesch et al patent utilizes a thin exposed metal layer applied on top of an electrochromic material.

The foregoing Jasinski, Kasai, and Bruesch et al patents, while having possibilities for reducing the thickness of electrochromic displays from the older more bulky displays using two substrate members, nevertheless are built up in layers from the single transparent substrate and do not readily lend themselves to mass production or to continuous processing. Also the layer thickness and processes require great care to achieve uniform results.

Accordingly, one object of the present invention is to provide an improved thin electrochromic display which is adapted for continuous process manufacture.

Another object of the invention is to provide an improved construction for a thin electrochromic display of uniform and consistent quality.

DRAWINGS

The invention, both as to organization and method of practice, together with further objects and advantages thereof, will best be understood by reference to the following description, taken in connection with the accompanying drawings, in which:

FIG. 1 is an elevation drawing in crossection of an electrochromic display, taken along lines II—II of FIG. 2, FIG. 2 is a plan view of the underside of the electrochromic display of FIG. 1, FIGS. 3a, 3b, and 3c are plan views of continuous process manufacture of electrochromic displays on a tape member, and FIGS. 4a, 4b, and 4c and elevation drawings, illustrating various steps in the manufacturing process in simplified form.

FIG. 5 is an elevation drawing in crossection of a thin electrochromic display suitable for multiplexing.

SUMMARY OF THE INVENTION

Briefly stated, the invention is practiced by providing an electrochromic display having a transparent substrate with transparent electrodes and electrochromic material thereon, a semi-solid or solid cationic ion exchange resin electrolyte in contact with the electrochromic material, a conductive foil member having an electroreactive layer thereon in contact with the electrolyte, and an impervious adhesive tape member adhered to the substrate around the foil member and also covering and adhered to the foil member, the tape member having an aperture therein for permitting electrical contact to be made with the foil member.

The process includes providing an impervious adhesive backing tape with apertures, positioning the foil member with electrolyte coating thereon over an aperture, positioning the substrate over the coated foil with the electrochromic material in contact with the electrolyte and adhering the tape to the foil and substrate. If the tape member is continuous with spaced apertures, a subsequent step includes severing the tape between substrates.

DESCRIPTION OF THE PREFERRED EMBODIMENT

Figure 1:
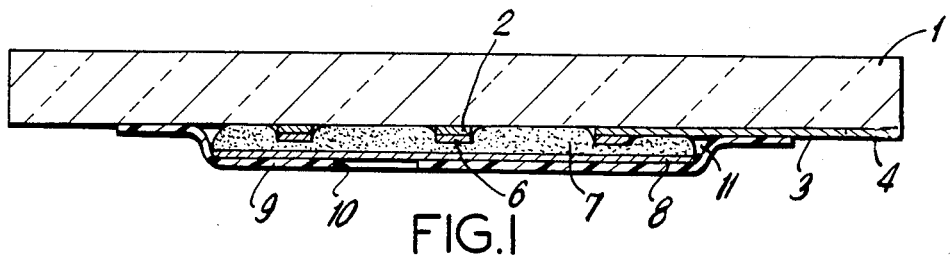

Referring now to FIG. 1 of the drawing, an electrochromic display shown in cross section comprises a transparent substrate 1, such as glass having transparent conductive electrodes 2 thereon. Electrodes 2 may be arranged in any desired pattern and provided with conductive leads 3 to contact terminals 4 on the edge of the substrate, each of the electrodes being provided with such a terminal so that it can be selectively actuated by application of a current source (not shown). The electrodes 2, may be formed by etching from a conductive tin oxide coating in any desired pattern, using commercially available material known as NESA glass, removing the conductive coating except for the segments and their connecting leads.

Figure 2:
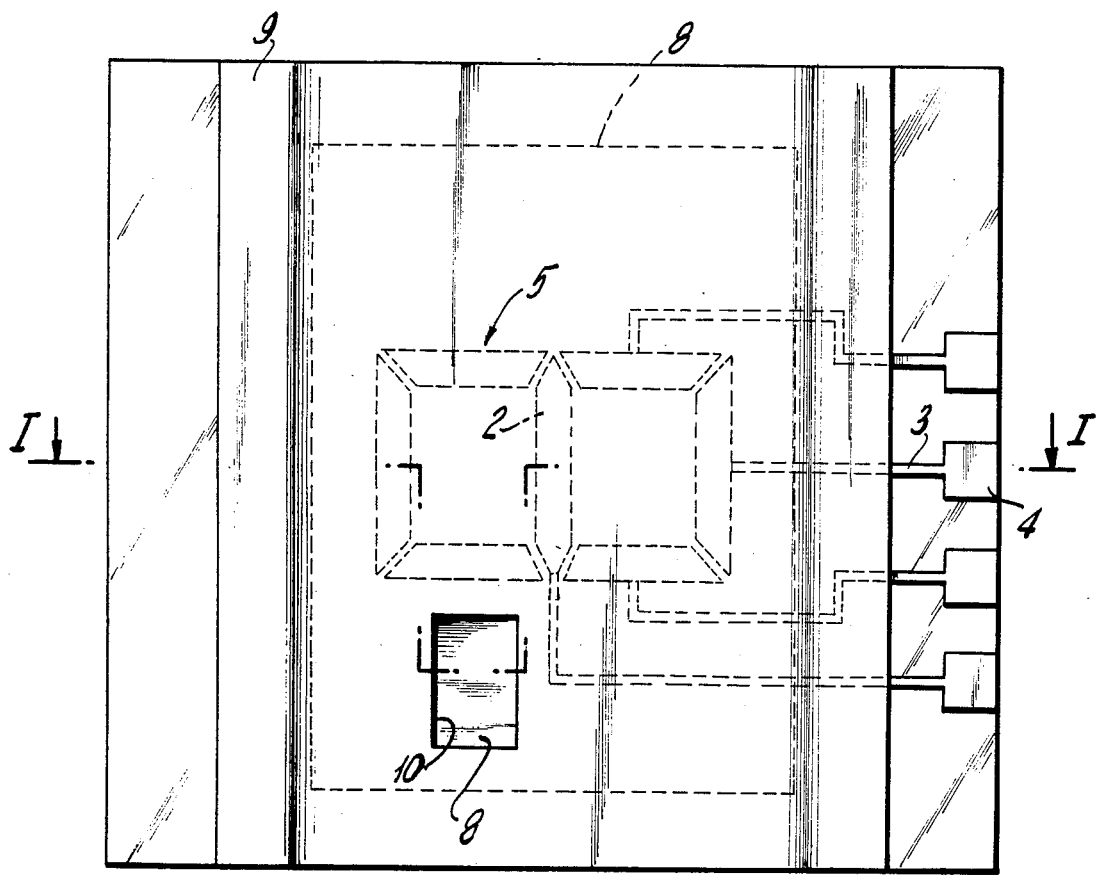

The display shown in the drawings of FIGS. 1 and 2 is simplified to provide only a single digit indicated by reference numeral 5, but several such digits may be employed on a single display. Also the invention is applicable to the use of several digits on the substrate and several electrically isolated rear electrodes as taught in the copending application of Marshall Leibowitz, Ser. No. 676,030 filed Apr. 12, 1976 and assigned to the present assignee.

Disposed on electrodes 2 are thin layers of persistent electrochromic material 6. Tungsten oxide is the preferred material, but there are a large number of electrochromic materials referred to, for example, in U.S. Pat. No. 3,521,941—Deb et al as well as the materials referred to in the aforementioned Bruesch et al patent. The electrochromic material may be applied by vacuum evaporation and deposition using masks.

Disposed in intimate contact with the electrochromic material 6 is a semisolid electrolyte 7, of cationic ion exchange resin in the acid form. This is in the form of a chemically wetted paste of putty-like consistency previously applied to a foil later to be described. The preferred electrolyte is a commercially available soluble form of polystyrene sulfonic acid. However, insoluble polystyrene sulfonic acid commercially available in powder form in a suitable binder is also useful. A color contrasting pigment such as titanium oxide is mixed with the electrolyte.

In accordance with one aspect of the present invention, a foil member 8 is positioned with an electroreactive layer disposed in contact with the solid electrolyte. This foil is preferably prepared from a tungsten metal foil treated in the manner described in assignee's aforementioned U.S. Pat No. 4,012,831 over the surface. A foil prepared in this manner serves as the conductive back electrode and provides requisite capacity enhancing the flow of cations to darken the electrochromic material 6 when the electrodes 2 are negative with respect to the back electrode (or foil 8).

Covering and adhered to the backside of the foil and also adhered to the substrate 1 around the outside of the foil is an insulating impervious film or backing tape 9 having adhesive on one side thereof. Several suitable tapes are commercially available. One is a contact tape number Y 8019 produced by Minnesota Mining & Manufacturing Company. Another is an aluminized Mylar tape prepared with a clear silicone contact adhesive Number 1158 manufactured by Custom Coating & Laminating Corp., Worcester, Mass.

An important feature of the present invention is the provision of an aperture 10 in the tape 9 exposing the foil 8, so that an electrical contact can be made with the back side of the foil through the aperture. The aperture 10 is preferably located at a place not directly over a segment of the digit, otherwise excessive contact pressure on the foil might change the spacing and affect the performance of the display.

A peripheral void or open space 11 is left between the electrolyte 7 and the interface between tape and substrate, since the electrolyte, which is acidic, might otherwise react adversely with the tape and the adhesive over a long period of time.

The tape 9 is narrower than the substrate width and is applied to the underside of the substrate, as shown in FIG. 2 to leave the contact terminals 4 exposed. The tape serves to completely seal around the foil and also to the surface of the foil to prevent moisture from leaving the electrolyte and also to prevent external contamination to the cell.

FIGS. 3a, 3b, and 3c show in plan view, and FIGS. 4a, 4b, and 4c in elevation view, a continuous processing method in symbolic form for manufacturing the thin electrochromic display of the present invention. The tape 9 is shown in FIG. 3a and provided with spaced apertures 10, with the adhesive side up. FIG. 4a shows the corresponding elevation view.

In FIG. 3b, and corresponding FIG. 4b, the foil members 8, previously oxidized and reduced as described, and having a semisolid electrolyte previously applied as a coating thereon, are positioned over the apertures 10, with the electrolyte 7 facing up. The electroreactive layer on the foil and the subsequent coating of electrolyte are applied separately in advance under controlled conditions.

In FIG. 3c, the substrates 1 with the prepared segment patterns of transparent electrodes 2 and electrochromic materials 6 thereon are positioned face down, so that the foil members 8 register with the segment patterns 5 on the substrates 1.

FIG. 4c, illustrates in cross section, a suitable tool 12 compressing the foil and electrolyte in the central portion of the display to provide proper spacing, compressing the edges for adhering the tape to the substrate and foil, and severing the tape. The foregoing process steps may be undertaken manually, or by automated continuous process.

Figure 5:
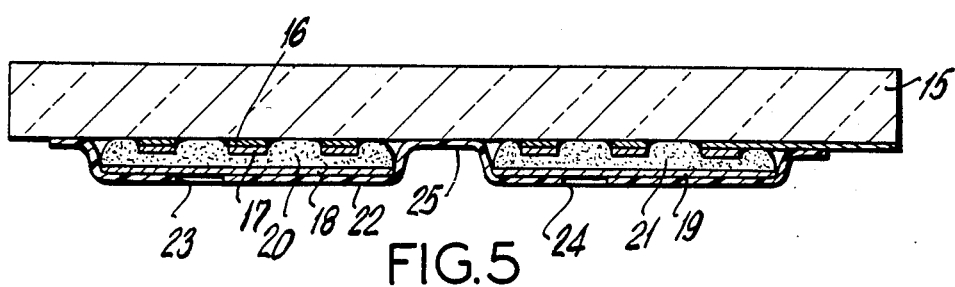

Referring to FIG. 5 of the drawing, a construction is shown which is adapted to a thin electrochromic display suitable for multiplexing, i.e. adding a plurality of separate or electrically insulated back electrode members, similar to the aforementioned pending application in the name of Leibowitz, Ser. No. 676,030.

A transparent substrate 15, transparent electrodes 16 with electrochromic materials 17 thereon are formed as previously. Two separate foil members 18,19 prepared as before, with semisolid electrolyte films 20,21 adapted to cooperate with separate sets of electrodes on the substrate 15. The single tape member 22 is employed with an aperture 23 exposing foil 18, and an aperture 24 exposing foil 19. Each isolated back electrode requires an opening in the adhesive sealant tape to make electrical contact to each isolated back electrode. However the tape is not severed between sections but is adhered to the substrate around both display sections and also between display sections as indicated at 25.

Thus there has been disclosed an improved construction for a thin electrochromic display, and method of making the same, which facilitates uniform and consistent preparation using tapes and foils rather than build-ups of layered materials. Therefore better quality control is possible and the process is adaptable to continuous automated manufacture.

While there has been shown what is considered to be the preferred embodiment of the invention and one modification thereof, it is of course understood that various other modifications may be made therein, and it is intended to cover in the appended claims all such modifications as fall within the true spirit and scope of the invention.

What is claimed is:

1. A thin electrochromic display cell comprising:
   a transparent substrate having transparent electrodes thereon, said electrodes coated with electrochromic material,
   a cationic ion exchange resin electrolyte disposed in contact with said electrochromic material,
   a conductive foil member having a coating thereon disposed in contact with said electrolyte to facilitate cationic transport of cations in said electrolyte for actuating said electrochromic material, and
   an insulating tape member covering and adhered to said foil member and also adhered to said substrate around the outside of said foil member, said tape member having an aperture therein for permitting electrical contact to be made with said foil member said tape member being impervious to moisture from said electrolyte and impervious to contaminates external to said cell.

2. The combination according to claim 1, wherein said tape member is narrower than the width of said substrate in one direction, and positioned to expose a portion of said electrodes, whereby an electrical potential may be applied between said foil member and selected electrodes.

3. The combination according to claim 1, wherein said foil member is a thin tungsten foil having an electroreactive coating thereon.

4. The combination according to claim 1, wherein said electrolyte is a layer of cationic ion exchange resin in the form of a chemically wetted paste of putty-like consistency.

* * * * *